US005092824A

United States Patent [19]
Connett

[11] Patent Number: 5,092,824
[45] Date of Patent: Mar. 3, 1992

[54] PUMP OUTPUT CONTROL SYSTEM WITH HIGH EFFICIENCY HYDROMECHANICAL VARIABLE SPEED DRIVE

[76] Inventor: Donald C. Connett, P.O. Box 31152, Rio Verde, Ariz. 85263

[21] Appl. No.: 594,426

[22] Filed: Oct. 9, 1990

[51] Int. Cl.$^5$ .......................................... E16H 47/04
[52] U.S. Cl. .................................. 475/72; 417/212; 417/406; 60/437
[58] Field of Search .................... 475/72, 74, 83, 88; 60/435, 436, 437; 417/405, 406, 407, 31, 1, 15, 212, 410; 74/189.5

[56] References Cited

U.S. PATENT DOCUMENTS

| | | | |
|---|---|---|---|
| 1,981,805 | 11/1934 | Kacer et al. | 475/72 X |
| 2,131,611 | 9/1938 | Biggs | 417/406 X |
| 2,390,240 | 12/1945 | De Lancey | 475/72 |
| 3,903,756 | 9/1975 | Hamma | 74/687 |
| 3,905,251 | 9/1975 | Greene | 60/437 X |
| 3,923,129 | 12/1975 | Rusch et al. | 60/436 X |
| 3,924,489 | 12/1975 | Yasuda | 74/688 |
| 4,295,792 | 10/1981 | Tachibana et al. | 417/15 |
| 4,341,132 | 7/1982 | Burdick | 475/72 |
| 4,381,174 | 4/1983 | Obler | 417/15 |
| 4,432,212 | 2/1984 | Tachibana et al. | 62/229 |
| 4,471,668 | 9/1984 | Elsner | 475/72 |
| 4,637,275 | 1/1987 | Whalen | 475/72 |
| 4,679,462 | 7/1987 | Baits et al. | 74/687 |
| 4,726,255 | 2/1988 | Humpfer et al. | 74/688 |
| 4,750,381 | 6/1988 | Kita et al. | 74/687 |
| 4,813,306 | 3/1989 | Kita et al. | 74/687 |
| 4,836,049 | 6/1989 | Moan | 74/689 |

FOREIGN PATENT DOCUMENTS

| | | | |
|---|---|---|---|
| 98051 | 5/1987 | Japan | 475/72 |
| 2179412 | 3/1987 | United Kingdom | 475/72 |

Primary Examiner—Leslie A. Braun
Assistant Examiner—Khoi Q. Ta
Attorney, Agent, or Firm—Harvey S. Hertz; William T. O'Neil

[57] ABSTRACT

A power recovery speed control apparatus for use in a system driven by a substantially constant-speed power source driving a turbine type water pump. The system includes a hydromechanical trimmer device controlled by pump output pressure to modify the turbine pump speed over a relatively small range as a function of pump output pressure. In series between the power source output shaft and the turbine pump drive shaft is a mechanical differential gear assembly having input, output and differential (speed difference) shafts. A fixed displacement hydrostatic transmission unit (pump) extracts a fraction of the source power at the differential shaft and applies it through hydraulic feed lines to a variable displacement hydrostatic transmission unit operated as a hydraulic motor. The hydraulic motor unit has its displacement controlled by a pump output pressure sensor and its output torque is introduced into the power train at the power source output or alternatively, at the turbine pump input shaft.

2 Claims, 5 Drawing Sheets

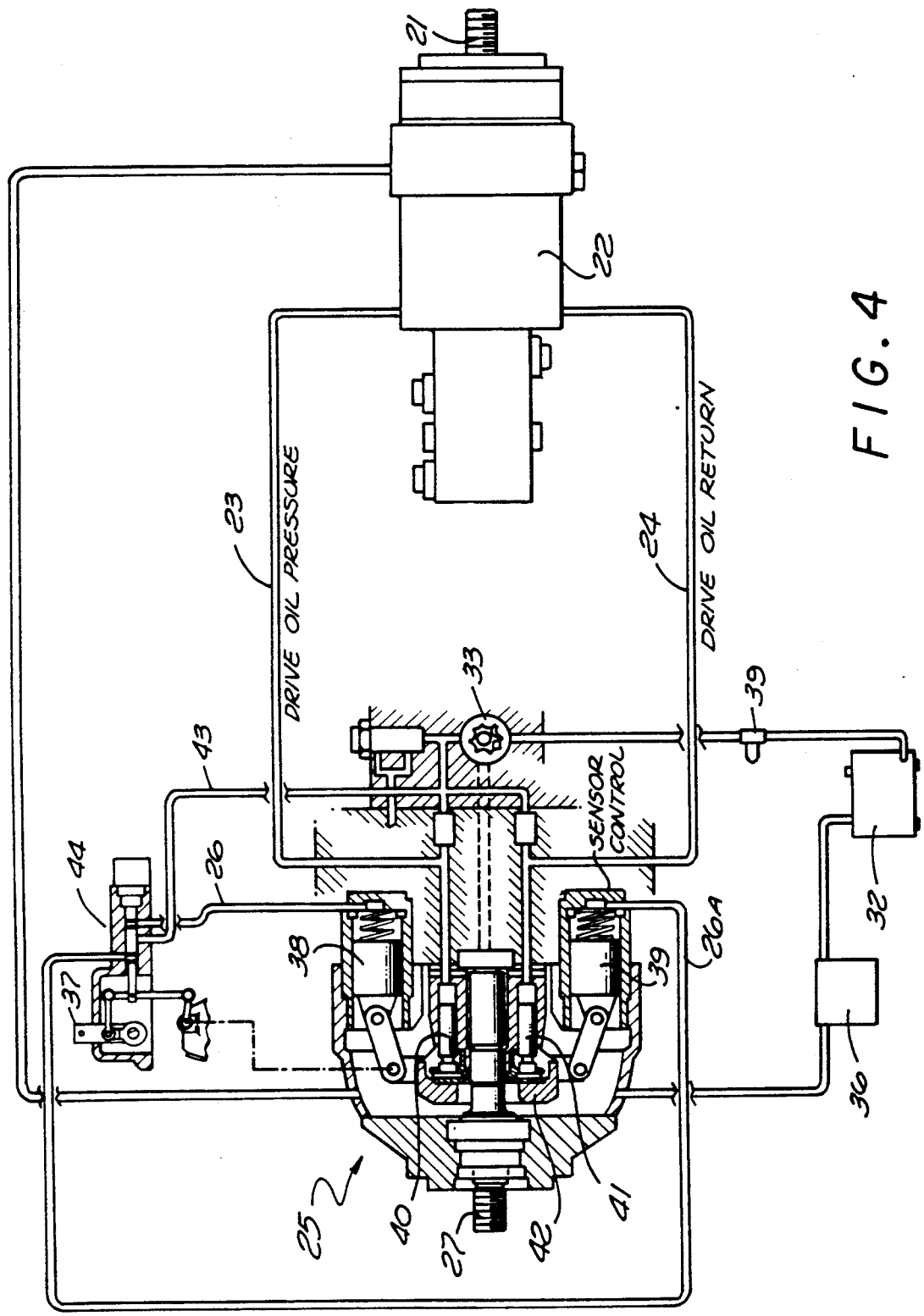

PUMP OUTPUT CONTROL SYSTEM WITH HIGH EFFICIENCY HYDROMECHANICAL VARIABLE SPEED DRIVE

BACKGROUND OF THE INVENTION

1. Field of the Invention

The invention relates to power transmission output speed control devices generally, and more specifically, to speed control of turbine type pumps requiring a relatively small range of speed variability.

2. Description of the Prior Art

In the prior art, various arrangements are extant for speed control of the type required in the turbine pump application. A typical turbine type pump is a vertical shaft unit with an induction electric motor driving the shaft. At a remote end of the shaft, down into a well casing, for example, a pump bowl assembly forces water upward. In well-known water systems, the turbine bowls and the drive motor are matched to fixed output water pressure and volume requirements and constant speed operation is appropriate.

In some applications, such as in irrigation systems, for example, water demand rates are variable and accordingly some form of water pump speed variability must be efficiently achieved. Of course, water pump output can simply be throttled back by partial valve closing to increase the effective head against which the pump operates to reduce flow. However, this option is wasteful of electric power. At current electric energy cost the resulting inefficiency is economically unacceptable.

Variable speed transmissions are well-known in the prior art, many of these being of the automotive type designed to accommodate a large range of engine speed variation and a similarly large range of output torque requirements. Such transmissions commonly include torque converters and/or step-wise gear shifting. Certain compromises among efficiency, engine speed modulation and output torque are necessary and, accordingly, these transmissions are not applicable to the limited speed variation range, high efficiency requirement inherent in irrigation system pumping. U.S. Pat. Nos. 3,903,756 and 4,836,049 are representative of that prior art.

A device including a fluid torque converter and a differential gearing arrangement for a variable speed processing machine is described in U.S. Pat. No. 4,726,255. That device is not suitable for application to the water pumping environment for which the present invention is devised.

Hydraulic transmission units are well-known in the art and have been extensively used in variable speed transmissions. However, they are commonly employed in series with the primary power train in a variable transmission system. These known elements are used in both fixed and variable displacement types and typically can function as hydraulic pumps or as hydraulic motors U.S. Pat. Nos. 4,750,381 and 4,813,306 are typical of that art.

Various other gear shifting, torque converter and clutching combinations are also extant. U.S. Pat. Nos. 4,295,792; 4,432,212 and 3,924,489 are representative of such combinations.

A belt and pulley drive with variable speed control by means of a variable pitch pulley is described in U.S. Pat. No. 4,381,174. Slip-clutch devices have been used for the purpose, but do not fulfill the power conservation objectives because of their poor efficiency.

The aforementioned examples of the prior art disclose system each for a particular purpose, but none of them would be structurally or functionally suitable for the application served by the invention disclosed hereinafter.

Perhaps the most pertinent prior art is that of U.S. Pat. No. 4,679,462 which employs some of the same components. However, that reference contemplates summation of the variable input power (from a variable speed aircraft engine) in a mechanical differential with a trim torque developed and applied to keep the output shaft speed constant for driving a generator or alternator at constant speed. The invention, on the other hand, contemplates a trim power take off from a differential and feeding the resultant torque back to the main power shaft either between the motor (main power source) and the differential or between the differential and the turbine pump shaft via a hydraulic pump/motor combination.

Another approach to variable speed turbine pump drive includes an A.C. line frequency changer such that the driving motor is caused to operate at a speed other than its 60 cycle design speed. Normally, the induction motor used operates at 1760 R.P.M. just slightly under synchronous speed of 1800 R.P.M. for a four pole motor. That motor speed is variable with load in a minor way, but for present purposes may be considered to be a constant speed power source. Varying the A.C. line frequency proportionally changes the motor speed, however, this being accomplished by rectification of the 60 cycle A.C. line source and feeding through a variable frequency inverter to set motor speed accordingly. Such a system is effective but it is noted that all the induction motor power must be handled by the rectifier and inverter. Accordingly, the power losses thus introduced are substantial and the cost of such a system is relatively large.

The manner in which the invention deals with the disadvantages of the prior art in setting forth a novel, efficient and relatively low cost system will be described hereinafter.

SUMMARY OF THE INVENTION

In consideration of the need for efficient automatic establishment of pump speed as a function of a predetermined turbine pump output pressure (and, therefore, delivery volume), the invention provides a mechanical differential in series with the main power shaft between the induction drive motor and the turbine pump bowls. The differential has a third shaft which turns at a speed which is the difference between the induction motor shaft speed and that of the pump bowl shaft. A hydrostatic pump (fixed displacement) has its shaft connected to the aforementioned third shaft of the mechanical differential and the fixed displacement pump connects through pressurized oil lines to a variable displacement hydrostatic unit which is controllable to accept power operating as a hydraulic motor. When the variable unit is in its controlled neutral position, it blocks the hydraulic oil flow from the fixed unit so that the third differential shaft is locked against rotation. In that condition the induction motor and the turbine pump bowl shafts rotate at the same speed, i.e. typically 1760 R.P.M. However, when the variable hydraulic unit is controlled off-neutral, the differential shaft is permitted to rotate at a speed depending on the degree of variable unit displacement control. Thus, the fixed displacement unit is permitted to rotate at sufficient speed to cause the desired reduction in transmission output speed; actual R.P.M. being a function of gearing step-up ratio chosen, which in turn is selected to permit use of the most efficient & economical hydrostatic units available.

The variable drive according to the invention is best suited to drive devices which exhibit a "propeller type" power curve, i.e., a squared relationship between speed and torque. Thus, a small speed change causes a large change in required power. A turbine type pump is such a device and accordingly only a few percent speed change is required to change the water delivery volume. The power diverted at the differential shaft into the fixed displacement pump passes into the variable unit via the hydraulic lines joining the fixed and variable units and causes the variable unit to operate as a motor. The shaft of the variable unit is coupled to the induction motor shaft or to the turbine pump bowl shaft where it provides a reentrant torque which "leans" into the power train connection thereby feeding back a large fraction of the power diverted at the differential shaft. The variable unit shaft rotates freely when the variable unit is controlled into the neutral position and does not load the feedback connection in that case.

The detailed description to follow describes a typical preferred embodiment of the invention.

BRIEF DESCRIPTION OF THE DRAWINGS

FIG. 4 is a sectioned view of an assembly of prior art units, including a fixed displacement hydraulic unit which can be used as a pump with a variable displacement hydraulic unit used as a motor;

DETAILED DESCRIPTION

Figure 1:
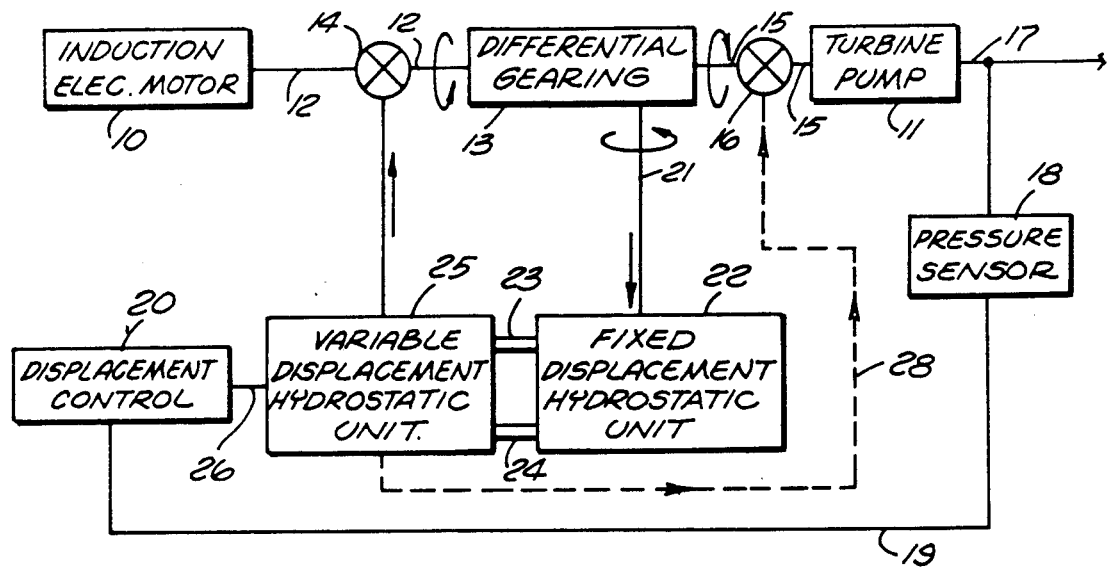
FIG. 1 is a block diagram of a system according to the invention.

Referring to FIG. 1, the basic concept and implementation of the combination of the invention are depicted. As indicated, the invention is particularly useful for turbine pumps driven by A.C. induction motors such as commonly employed in irrigation systems. However, it will be realized as the invention is understood that the invention could also be applied where the source of drive power is some other substantially constant speed source. The greatest advantages of the invention are realized with the most commonly used A.C. induction motor power drive.

In FIG. 1 an A.C. induction motor 10 is shown in block form, and the mechanical differential gearing is represented at 13. Shaft 12 connects the motor 10 to the differential gearing 13 and shaft 15 connects differential gearing 13 to turbine type water pump 11. Torque feedback gearing may be either at 14 or alternatively at 16 on FIG. 1, but not both. Accordingly, the variable hydraulic motor output is at either 27 or, alternatively 28. Water output from turbine pump 11 is at 17 and at that point pressure sensor 18 is connected thereto. An output signal on lead 19 may be either electric or otherwise, (hydraulic, for example) and is applied to a displacement control unit 20 via line 26. The variable displacement hydraulic unit is always rotating at electric motor speed through gear engagement 14 (via shaft 27), or at transmission output speed, if alternate gear engagement 16 (via shaft 28) is used. The variable motor transmits no torque at zero displacement. Bringing the variable motor on stroke, that is adding displacement, allows the fixed pump to rotate proportionately as the motor will now accept flow form the pump via line 23. As it rotates, the pump 22 is subtracting speed from the transmission output shaft, and the resultant flow to the variable motor allows the variable motor to transmit torque at its connecting shaft 14, (or alternatively, shaft 16) in proportion to its displacement.

It is important to note that in the case of the variable motor input being between the electric motor and the differential gearing, the variable motor is always running at constant speed, and never changes speed regardless of transmission output speed or control inputs. The variable motor can only "lean" into the load and relieve the electric motor of some of the torque it must put out. The variable motor does not ever effect the speed of the shaft that it is connected to when used in the FIG. 3 configuration. The same is basically true in the FIG. 3a configuration except that the motor speed will vary from full speed to approximately 80% of full induction motor speed. In this case its speed is indirectly controlled by its displacement and, therefore, the speed it allows the pump 22 to subtract. The torque delivered by the variable motor 25 has no effect on the speed of the shaft it is connected to.

Figure 1A:
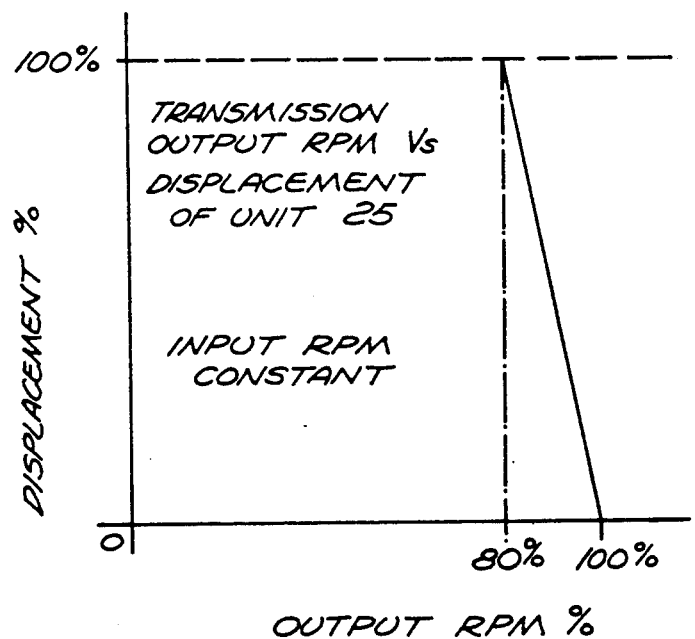
FIG. 1A is a graph of the output speed (turbine pump shaft speed) versus displacement of the variable displacement hydrostatic unit.

FIG. 1A is a graph of the output R.P.M. of the transmission as a function of the displacement of the variable motor 25. Turbine pump "speed" is preferably only variable to produce a speed trimming effect (down to approximately 80% of the induction motor speed, for example).

Figure 2:
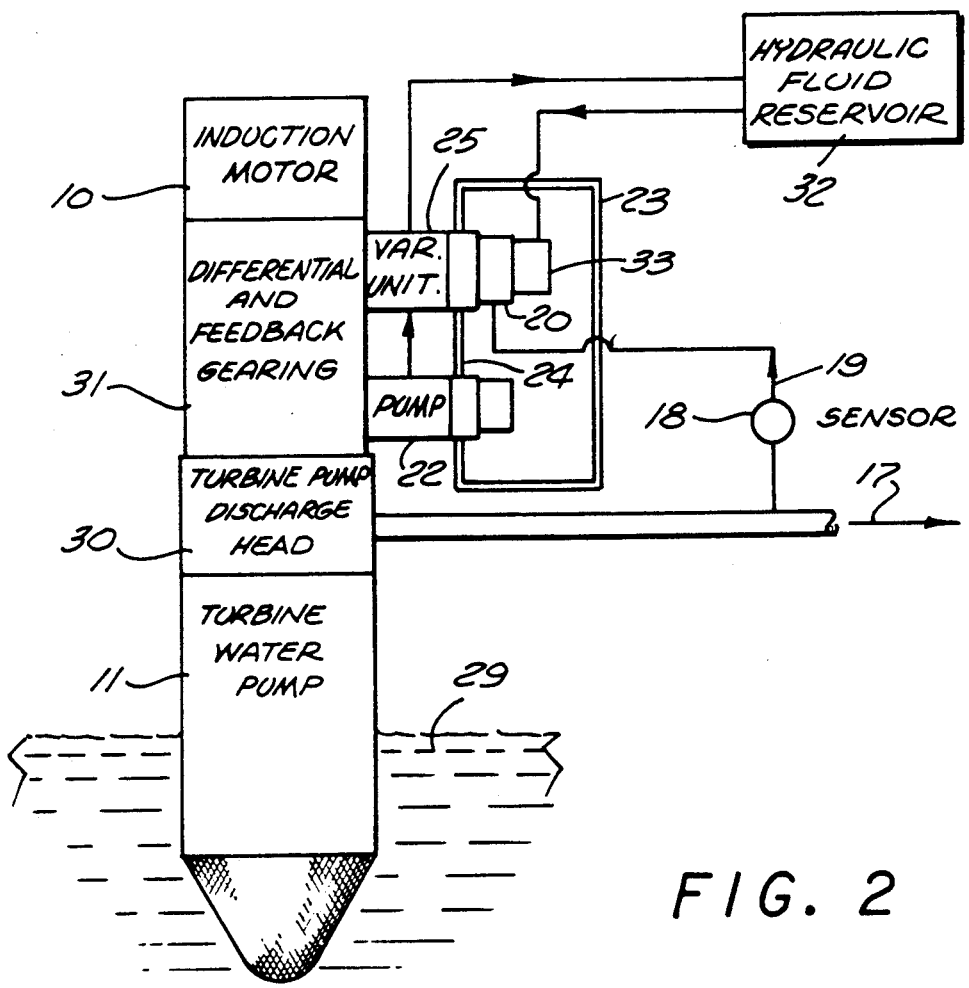
FIG. 2 is a block diagram of a typical water pumping system according to the invention.

Referring now to FIG. 2, a pictorial block diagram of a system according to the invention is shown as it can be applied to water pumping (in an irrigation system, for example). Turbine pump 11 is immersed in a wet well 29 and pumps water in a well-known way through a discharge head 30 and onto a discharge (delivery) line 17 and thence to agricultural or other use. A sump or forebay (not shown) may be used at line 17 in a conventional way.

Block 31 contains both the differential gearing 13 and feedback gearing 14 or 16 referred to in describing FIG. 1. Induction A.C. motor 10 is typically at the top of the assembly of FIG. 2. Hydrostatic (fixed displacement pump) unit 22 and variable displacement unit 25 are interconnected by hydraulic fluid lines 23 and 24 and are mechanically coupled into the differential and feedback gearing block 31 in a manner which will be clear as this description proceeds.

As is conventional in a hydrostatic system, a hydraulic fluid reservoir 32 and a charge pump 33 are provided. It will be seen from FIG. 2 that the sub-assemblies which are part of the novel system of the invention are readily integrated into the well-head structure.

A conventional pressure sensing unit 18 is shown at the output of turbine pump delivery line 17 for compactness. The displacement control of hydrostatic motor unit 25, which is basically a known hydraulic unit, is depicted in FIG. 4, to be described.

Figure 3:
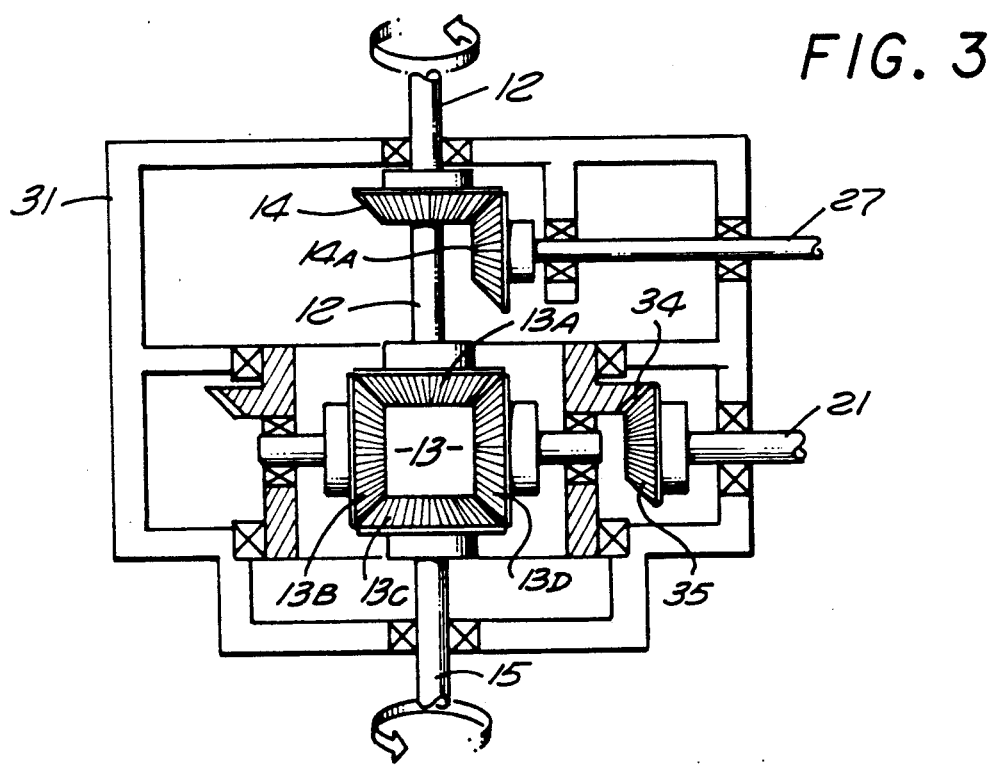
FIG. 3 is a detail drawing of a typical variable speed gearbox assembly including differential and torque feedback gearing.

FIG. 3 shows the differential 13 and feedback gearing 14 and 14A in a first embodiment in which the torque feedback is inserted at the shaft 12 essentially additive with the A.C. induction motor torque. Looking again at FIG. 1 and FIG. 2 it will be realized that shafts 21, 27 and 28 are integral within the interface between gearing 31, fixed displacement pump 22 and variable displacement motor 25, and shafts 12 and 15 are likewise integral within the assembly of FIG. 2.

In FIG. 3, a pair of bevel gears 14 and 14A applies feedback torque to shaft 12 from shaft 27 which is the output of the variable displacement hydraulic motor unit 25. Fixed displacement pump unit 22 is driven from shaft 21 at a speed which is proportional to the algebraic difference between the speeds of shafts 12 and 15. The differential gearing 13 is entirely conventional and includes meshed gears 13A, 13B, 13C and 13D as shown. As is well-known, a cage or carrier is coupled to shaft 21 by gears 34 and 35. This cage or carrier rotates about the gear assembly 13 in a manner well understood in the art.

Figure 3A:
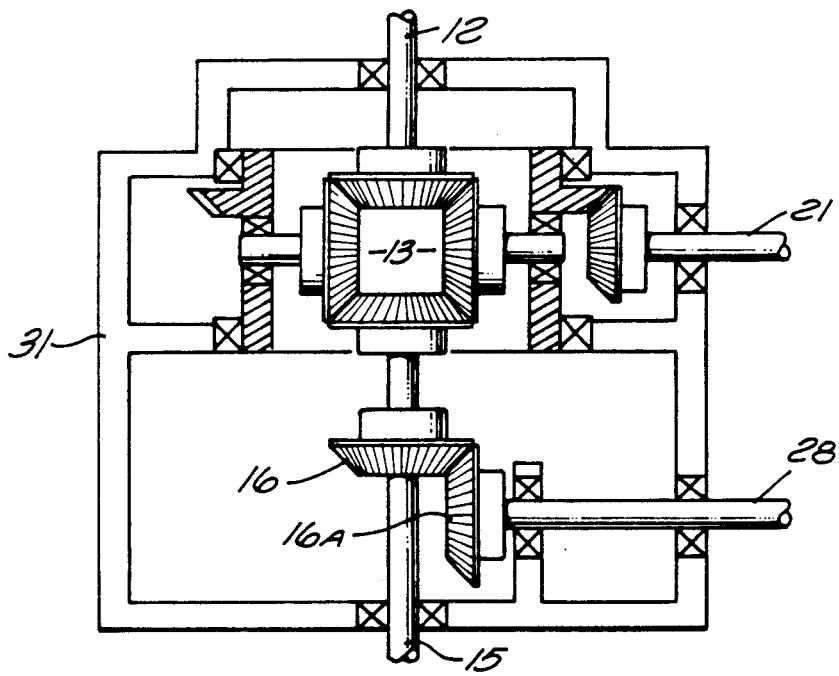
FIG. 3A is a detail drawing of a variation of the gearbox assembly of FIG. 3 in which the torque feedback gearing is connected to the turbine pump shaft.

FIG. 3A is identical to FIG. 3 in all respects except that output coupling of the torque feedback is employed through meshed gears 16 and 16A at shaft 15 rather than at shaft 12 as was the case with the arrangement of FIG. 3.

The fixed displacement hydraulic motor unit 22 and the variable hydraulic motor unit 25 are entirely conventional per se and are variously available as items of commerce. One particularly suitable source of those units is Sundstrand Sauer, 2800 East 13th St. Ames, Iowa 50010. Alternatively, another suitable source for those units is Eaton Corporation, 28 Fluid Power Division, Homer Road and B Drive South; Marshall, Michigan 49068. The units available are relatively large in power handling capability and thus can readily handle induction motor pump drives up to 150 H.P. to provide ±20 H.P. power feedback.

It should be understood at this point in the description that hydraulic (hydrostatic) units 22 and 25 are reciprocating piston type devices and, thus, either is capable of operation as a pump or as a motor. In the present combination, the fixed displacement unit 22 operates as a pump driving the variable unit 25 through a high pressure line 23 and a spent pressure return line 24. It is also important to observe that the variable displacement unit has controlled admittance for hydraulic fluid as will be described hereinafter, and in the mode wherein the turbine pump 11 is to be operated at the full speed of the induction motor 10, the variable displacement unit 25 is controlled into the neutral (zero displacement) to block the flow of hydraulic fluid from pump 22. This causes pump 22 to be locked into the non-rotating mode and shaft 21 is, therefore, not permitted to rotate. Thus the mechanical differential 13 passes the full speed of motor shaft 12 to turbine pump shaft 15 and the variable displacement unit is free to rotate, but does not load its connection to shaft 12 or 15 since variable displacement unit 25 is in the zero displacement condition and there is no hydraulic interaction with pump 22.

When same speed trimming is desired as dictated by a lower required turbine pump output, the variable displacement unit 25 is modulated to accept more or less of the hydraulic fluid pumped by 22 and shaft 21 is thereby permitted to rotate at a constrained speed by the differential 13.

Referring now to FIG. 4, the combination of hydraulic pump unit 22 and variable displacement unit 25 as required by the invention is shown. Pump 22 is locked out of rotation in this configuration because variable displacement motor 25 is in neutral (swashplate 42 in the position shown) and does not accept drive oil from pump 22. As previously indicated, shaft 27 "freewheels" in this neutral mode of the variable displacement hydrostatic motor unit 25 and neither shaft 12 nor 15 is thereby loaded.

The cylinders and pistons at 40 and 41 are not driven with swashplate 42 in the indicated neutral position and, therefore, the displacement of unit 25 is effectively zero.

In FIG. 4 a manual control unit 44 is shown. Lever 37 is in the corresponding neutral position so that hydraulic fluid from line 43 is passed through aligned passages in unit 44 to both servo control 38 and 39 via line 26 and 26A respectively. A heat exchanger 36 and the previously mentioned hydraulic fluid reservoir 32 are also indicated on FIG. 4. The servo control sub-assemblies 38 and 39 serve to orient the swashplate 42 which actually controls the displacement of unit 25 through associated linkages. Further description of the hydrostatic units and their apperterences is possible, but not necessary since these units are commercially available for the purpose.

Figure 6:
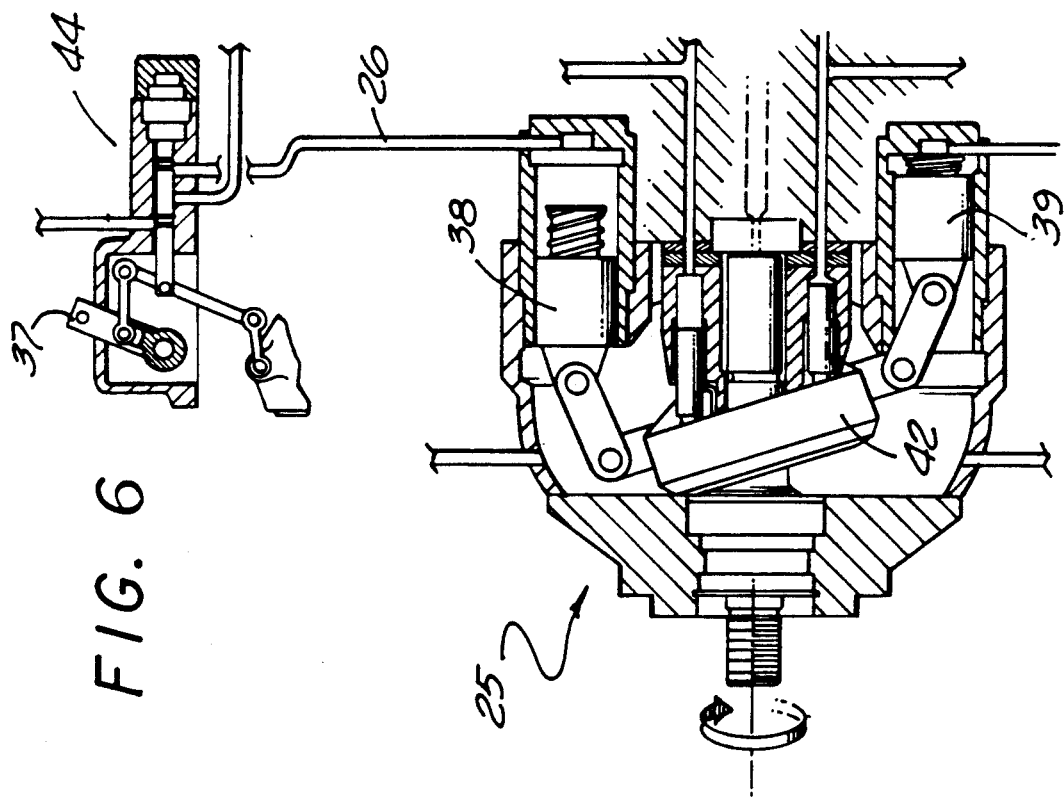
FIG. 6 is a view of the variable displacement hydraulic unit of FIG. 5 and FIG. 6 shown in a reverse rotational mode.
Figure 5:
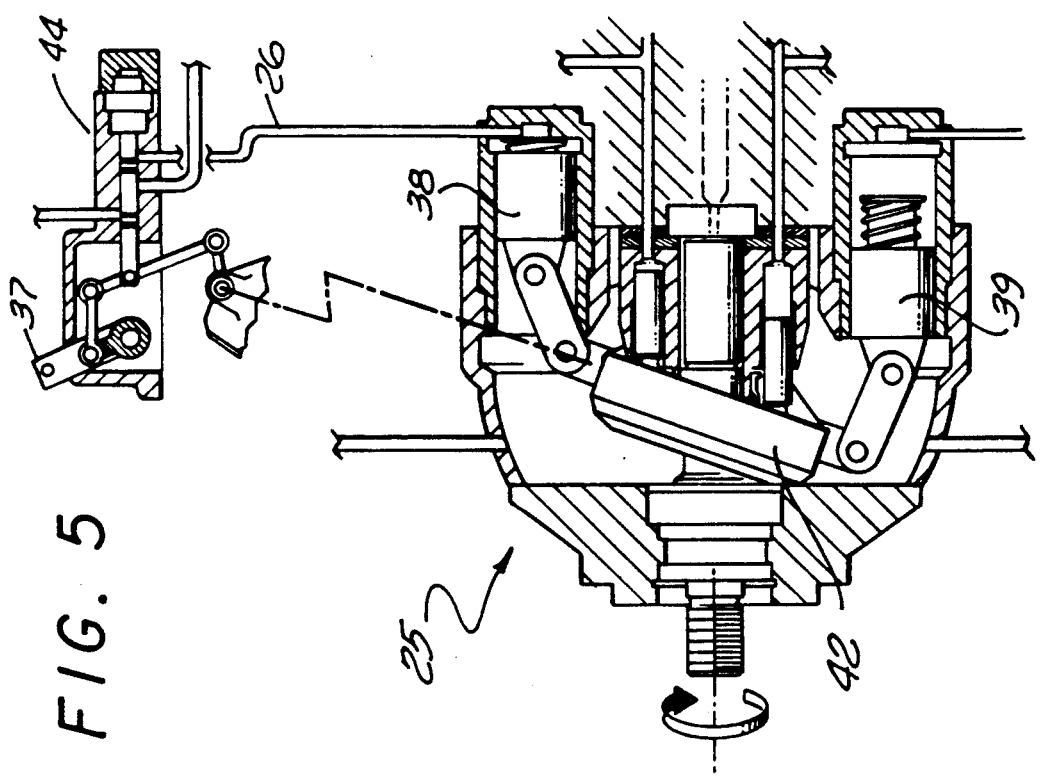
FIG. 5 is a sectioned drawing of the prior art variable displacement hydraulic unit of FIG. 4 with a manual servo control valve, shown in forward rotational mode.

FIGS. 5 and 6 depict unit 25 in the forward and reverse operational modes, respectively. Unit 25 in FIGS. 5 and 6 is identical to that shown in FIG. 4, except for orientation of the swashplate 42. In FIG. 5 the swashplate 42 is considered to be in the "forward" mode in which speed reduction is effected at shaft 15. This is the normal operational mode. However, the system is basically capable of increasing the shaft 15 speed if the swashplate 42 is oriented in the "reverse" mode as in FIG. 6. The corresponding setting of lever 37 in manual control 44 is illustrated in each of FIGS. 5 and 6.

Figure 7:
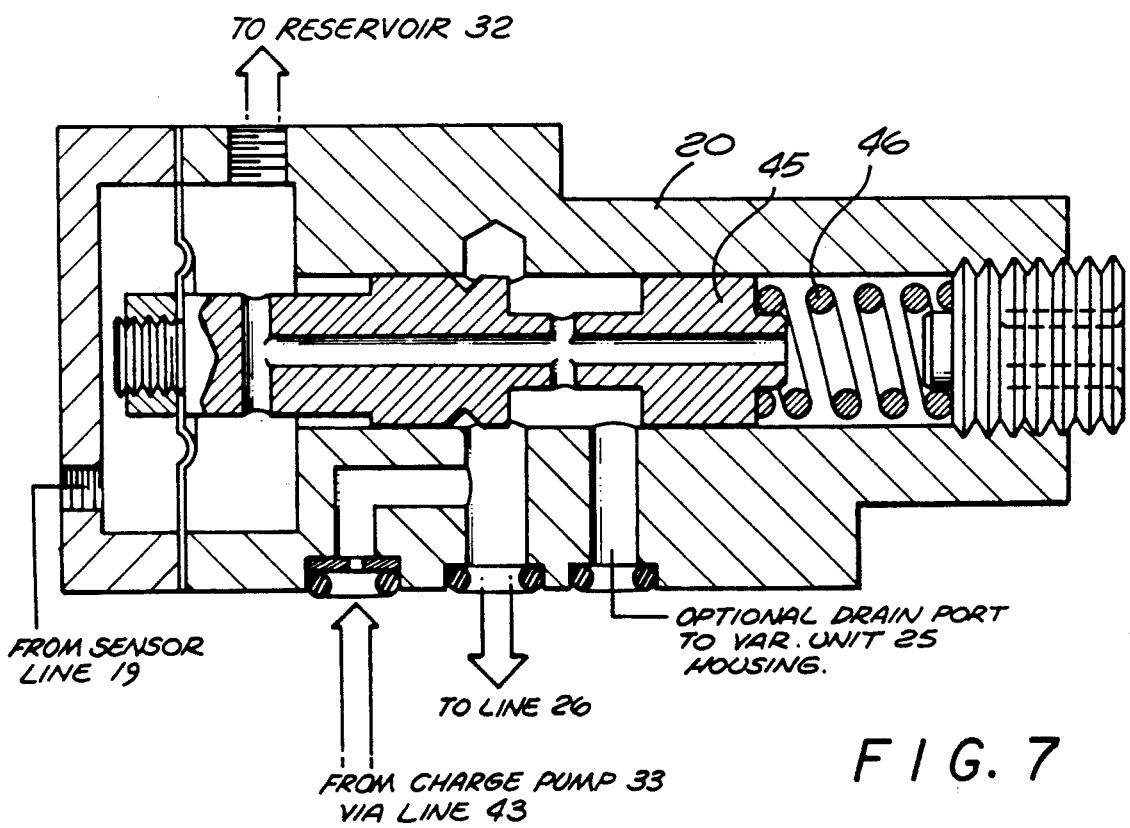
FIG. 7 is an axially sectioned view of a typical hydraulic pressure control valve for displacement control of the variable displacement hydraulic motor unit.

To achieve fully automatic system control, it is necessary to convert the turbine pump output pressure at 17 to a corresponding hydraulic signal, this being accomplished with a conventional sensor 18 and a displacement control unit 20. The term signal as used herein is intended to cover control valves in hydraulic or other mediums. This control unit 20, shown in FIG. 7, is per se also conventional. An axially positionable piston 45 travels against spring 46 to provide flow paths (or block them off) according to the axial position of piston 45. Unit 20 would take the place of manual unit 44 in FIGS. 4, 5, and 6.

Although the position of swashplate 42 is shown at an extreme in FIG. 5, it is to be understood that swashplate 42 will assume any orientation between that of FIG. 5 and the neutral position of FIG. 4 in operation as controlled by the displacement control unit 20 operating with element 38 and 39 in unit 25.

Various modifications within the scope of the invention will suggest themselves to the skilled reader. Accordingly, it is not intended that the scope of the invention should be considered limited by the specifics of the drawings or this description, these being typical and illustrative only.

I claim:

1. A system for controlling the delivery rate of a liquid pump to a predetermined level, said pump including a source of substantially constant speed drive power and a pump exhibiting a non-linear power versus fluid delivery characteristic such that a predetermined reduction of said drive power effects a proportionally larger corresponding reduction of said delivery rate, the combination comprising:

first means comprising a mechanical differential having a first shaft connected from said source of drive power, a second shaft connected to said pump and a third shaft providing an output at speed proportional to the difference between the speeds of said first and second shafts;

second means comprising a fixed displacement hydraulic pump driven from said third shaft and a variable displacement hydraulic motor powered by pressurized hydraulic fluid from said fixed displacement hydraulic pump, said variable displacement hydraulic motor having an output shaft and displacement adjustment means controllable by an externally applied parameter;

third means comprising a mechanical power reentry connection from said variable displacement hydraulic motor output shaft to a point in the power train between said source of drive power and said liquid pump;

and fourth means responsive to the output pressure of said liquid pump as a parameter relating to said liquid pump delivery rate to control said displacement of said variable displacement hydraulic motor.

2. The combination according to claim 1 in which said liquid pump is a turbine type pump and said source of drive power is an alternating current induction motor.

* * * * *